United States Patent [19]

Nakagawa et al.

[11] Patent Number: 4,961,031
[45] Date of Patent: Oct. 2, 1990

[54] FOCUS VOLTAGE REGULATION CIRCUIT FOR CATHODE RAY TUBES

[75] Inventors: Mitsuhisa Nakagawa; Shogo Koseki, both of Ome, Japan

[73] Assignee: Nippon Chemi-Con Corporation, Tokyo, Japan

[21] Appl. No.: 260,049

[22] Filed: Oct. 20, 1988

[30] Foreign Application Priority Data

Nov. 30, 1987 [JP] Japan ............................... 62-299823

[51] Int. Cl.$^5$ ..................... H01J 29/58; H01J 29/70
[52] U.S. Cl. ..................................... 315/382; 315/411
[58] Field of Search ................. 315/382, 382.1, 411, 315/381; 358/190

[56] References Cited

U.S. PATENT DOCUMENTS 3,519,741 7/1970 Knight ............................... 358/190
4,218,720 8/1980 Kam et al. ........................ 315/411

*Primary Examiner*—Gregory C. Issing
*Attorney, Agent, or Firm*—Young & Thompson

[57] ABSTRACT

A voltage supply circuit for cathode ray tubes in which a horizontal drive pulse is supplied to a flyback transformer and a flyback pulse to be derived from the flyback transformer is supplied as a cathode voltage, a grid voltage and an anode voltage for a cathode ray tube, to provide a focus voltage regulation circuit for cathode ray tubes is disclosed wherein the flyback pulse to be derived from a part of the flyback transformer is rectified to obtain a direct current voltage which is in turn varied for application as a cathode voltage and/or a grid voltage or superimpose onto the anode voltage so that a potential difference between the cathode voltage, the grid voltage and the anode voltage is variably and relatively regulated.

6 Claims, 5 Drawing Sheets

FOCUS VOLTAGE REGULATION CIRCUIT FOR CATHODE RAY TUBES

FIELD OF THE INVENTION

This invention relates to a focus voltage regulation circuit for cathode ray tubes (hereinafter referred to as "CRT"), and more particularly to a focus voltage regulation circuit for obtaining an optimum focal point for magnetic focusing CRTs.

BACKGROUND OF THE INVENTION

A well known example of the conventional magnetic focusing CRT has an electrode structure consisting of a cathode K, a primary grid $G_1$, a secondary grid $G_2$ and an anode A. In the CRT of this type, video or other control signals are generally input for the primary grid $G_1$ and the cathode K while the anode A is applied by an anode voltage to be generated by the secondary coil of the flyback transformer. For example, the primary side of the flyback transformer is supplied with a horizontal drive pulse to drive the deflecting yoke, while the flyback pulse is supplied to the primary side of the flyback transformer which resonates from the resonating condenser and the deflecting yoke during the horizontal retrace line period, thus causing the secondary coil to produce the necessary anode voltage.

Furthermore, in the CRT of this type a horizontal retrace line-pulse is generally applied to the low voltage section of the high voltage coil in order to keep the high voltage uniform, but when enough pulse is built up to keep the high voltage uniform, the focus voltage extracted from the intermediate tap on the high voltage coil tends to fluctuate. In such cases, the pulse length of the flyback voltage is changed by the flyback transformer, or the power voltage is changed in order to obtain an optimum focal point for the CRT.

However, in the described conventional system of changing the pulse length of the flyback voltage, high voltages are generally used, with difficulty in smooth adjustment and insufficient range of adjustment. According to the system of changing the power voltage, power loss is caused with dispersion of the deflection dimensions in the CRT and changes in brightness which disturbs reproduction of appropriate images.

Furthermore, the flyback pulse to be obtained from the primary side of the playback transformer is influenced by the deflecting yoke, the resonating condenser, the flyback transformer and the other components, providing dispersions in the pulse amplitude and the magnitude value, so that the anode voltage to be produced by the secondary side of the flyback transformer is difficult to come within the allowable values necessary for the CRT.

A purpose of the invention is to provide a focus voltage regulation circuit for cathode ray tubes where when the flyback pulse to be derived from the flyback transformer is supplied as a cathode voltage, a grid voltage and/or an anode voltage for the cathode ray tube, the direct current voltage to be obtained by rectifying a part of the flyback pulse is variably provided to variably and relatively regulate the potential difference between the cathode voltage, the grid voltage and the anode voltage allowing an adjustment of the optimum focal point free of any power loss with a simple circuit arrangement.

SUMMARY OF THE INVENTION

In order to solve the problems in the prior arts as hereinbefore described, the invention provides a focus voltage regulation circuit for cathode ray tubes in which a horizontal drive pulse is supplied to a flyback transformer and a flyback pulse to be derived from the flyback transformer is supplied as a cathode voltage, a grid voltage and an anode voltage for a cathode ray tube to provide a focus voltage regulation circuit for cathode ray tubes, characterized in that the flyback pulse to be derived from a part of the flyback transformer is rectified to obtain a direct current voltage which is in turn varied for application as a cathode voltage and/or a grid voltage or superimposed onto the anode voltage so that a potential difference between the cathode voltage, the grid voltage and the anode voltage is variably and relatively regulated.

The focus voltage regulation circuit for cathode ray tubes described hereinbefore may preferably constructed such that the anode voltage is regulated by superimposing through a variation means a direct current voltage obtained by rectifying a secondary or a tertiary flyback pulse and supplied to the cathode or grid of the cathode ray tube onto the primary flyback pulse supplied to the anode of the cathode ray tube.

Further, the focus voltage regulation circuit may be arranged such that a flyback pulse based on the horizontal drive pulse is supplied to the primary side coil of the flyback transformer, the voltage induced in the secondary side coil of the flyback pulse transformer is supplied to the anode of the cathode ray tube, a tap is provided on a part of the secondary side coil of the flyback transformer in order to obtain a grid voltage for the cathode ray tube, a regulating resistance is provided on the output side of a rectifying circuit which is direct current insulated from the tap and extracts the grid voltage, and the voltage regulated by the regulating resistance is superimposed onto the secondary coil side of the flyback transformer.

Furthermore, the focus voltage regulation circuit according to the invention may also be arranged such that the secondary coil side of the flyback transformer is divided into a primary coil and a secondary coil so that a grid voltage for the cathode ray tube is obtained from an induction voltage induced from the primary coil while the direct current voltage obtained by rectifying the induction voltage is regulated and the direct current voltage thus regulated is superimposed onto the induction voltage from the secondary coil to obtain a combined voltage which is subsequently rectified to obtain an anode voltage. In this case, it is desirable to construct the focus voltage regulation circuit such that the secondary side coil of the flyback transformer is divided into a primary coil and is provided with a negative rectification circuit and a positive rectification circuit respectively, the direct current voltage to be obtained from the negative rectification circuit is regulated for supply to the primary grid of the cathode ray tube along with a video signal, and the direct current voltage to be obtained from the positive rectification circuit is divided and a part which is supplied to the secondary grid while the rest is regulated and superimposed onto the voltage induced from the secondary coil.

It is also acceptable to construct the focus voltage regulation circuit according to the invention such that the primary coil division of the secondary side coil of the flyback transformer is provided with a positive primary rectification circuit and a positive secondary rectification circuit respectively and also an intermediate tap to form a positive tertiary rectifying circuit, a direct current voltage to be obtained from the primary rectifying circuit is regulated and supplied with a video signal to the primary grid of the cathode ray tube, the direct current voltage obtained from the tertiary circuit is supplied to the secondary grid, and the direct current voltage to be obtained from the secondary rectifying circuit is regulated and superimposed onto the voltage induced from the secondary coil.

The focus voltage regulation circuit according to the invention may further be constructed such that a flyback pulse based on a horizontal drive pulse is supplied to the primary side coil of the flyback transformer, a voltage induced from the secondary side coil of the flyback transformer is supplied to the anode of the cathode ray tube, provision is made of a coil on the primary side of the flyback transformer to obtain a grid voltage for the cathode ray tube, a regulating resistance is provided on the output side of a rectifying circuit to extract a grid voltage from the coil tap and a voltage regulated with the regulating resistance is superimposed onto the secondary coil side of the flyback transformer.

In addition, the focus voltage regulation circuit according to the invention may be arranged such that a direct current load in relation to the reference point of potential of a primary coil on a flyback transformer which generates a primary flyback pulse to be supplied to an anode of a cathode ray tube is fixed and also a direct current load at a reference point of a secondary or tertiary coil of a flyback transformer which generates a secondary or tertiary flyback pulse to be supplied to the cathode and/or grid of a cathode ray tube is regulated for example by means of a resistance regulator so that the cathode voltage and the grid voltage are regulated against the anode voltage.

BRIEF DESCRIPTION OF THE DRAWING

Embodiments of the focus voltage regulation circuit for cathode ray tubes (CRTs) according to the invention is described hereinafter with reference to the accompanying drawings in which.

PREFERRED EMBODIMENTS OF THE INVENTION

Figure 1:
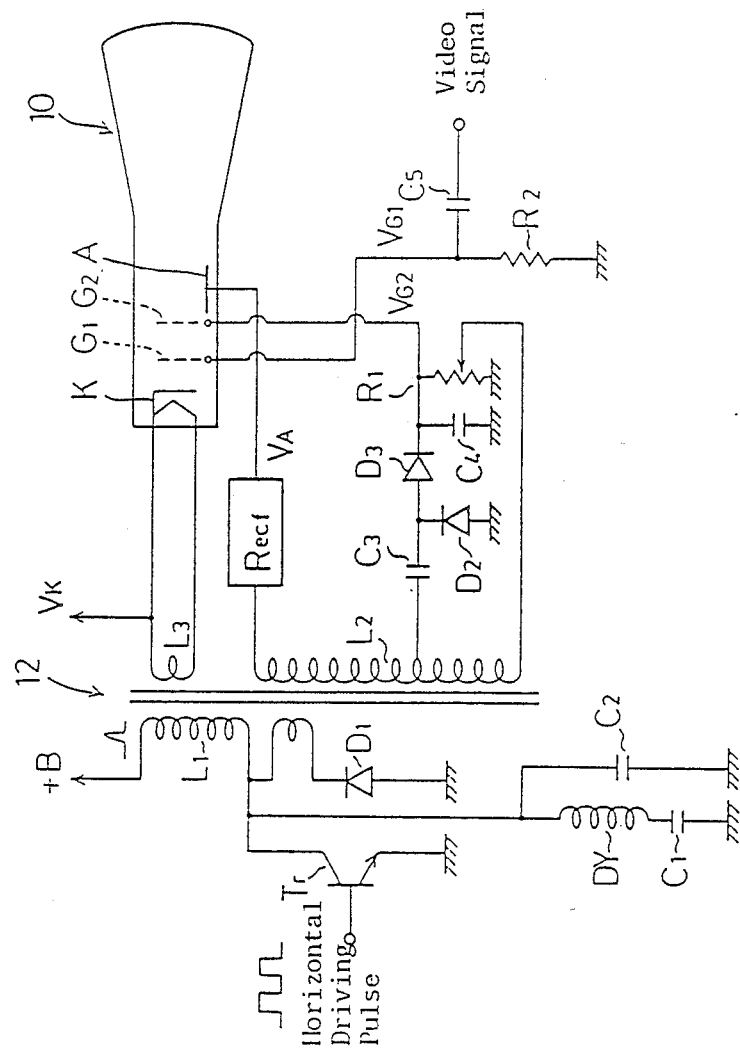
FIG. 1 is a fragmental circuit diagram showing one embodiment of the focus voltage regulation circuit for cathode ray tubes (CRTs) according to the invention.

In FIG. 1, the reference numeral 10 shows a magnetic focusing CRT with an electrode structure consisting of a cathode K, a primary grid $G_1$, a secondary grid $G_2$ and an anode A. Reference numeral 12 represents a flyback transformer to a primary side coil $L_1$ to which are connected a transistor Tr which supplies a drive pulse, a deflecting yoke DY, a direct current prevention condenser $C_1$, a resonating condenser $C_2$ and a dumper diode $D_1$.

Further in this embodiment, a tap is provided on a part of the secondary side coil $L_2$ of the flyback transformer 12 and a voltage generated by the tap is rectified through a direct current insulating condenser $C_3$, rectification diodes $D_2$ and $D_3$ as well as a smoothing condenser $C_4$ to obtain a supply voltage $V_{G2}$ for the secondary grid $G_2$.

A bleeder resistor $R_1$ is arranged in output lines of the diode $D_3$ and the condenser $C_4$ and a regulated voltage obtained from the bleeder resistor $R_1$ is superimposed onto the anode voltage induced in the secondary side coil $L_2$ of the flyback transformer 12. The anode voltage thus obtained is applied to an anode of the CRT 10 through the rectifying circuit $R_{ecf}$. It should be noted that a video signal is supplied to a primary grid $G_1$ of the CRT 10 through the condenser $C_5$ and the resistor $R_2$.

By this arrangement, a constant voltage may be supplied to the secondary grid $G_2$ of the CRT for an advantageous use of the regulating voltage of the anode voltage. In particular, according to this embodiment a constant voltage may conveniently be supplied from the secondary side coil of the flyback transformer to the CRT grid serving as the regulation voltage for the anode voltage so that an optimum focal point for the CRT may appropriately and smoothly be determined. Also, a tap is provided on the secondary side coil of the flyback transformer which extracts a grid voltage from the voltage induced thereby with no substantial increase of the flyback transformer coils, but retaining a small size. Furthermore, a simple circuit is used for the regulation voltage of the anode voltage enabling a direct current insulation is possible with a stable focus regulation.

Figure 2:
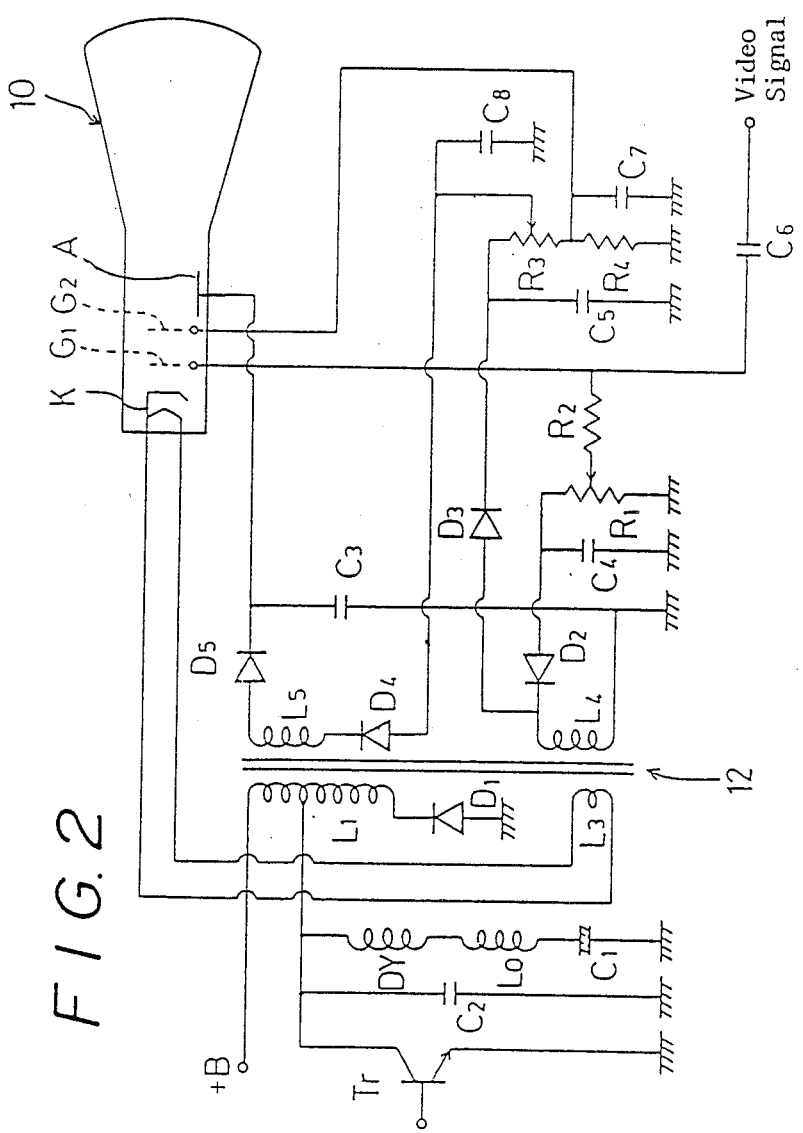
FIG. 2 is a circuit diagram of the focus voltage regulation circuit for cathode ray tubes (CRTs) of another embodiment according to the invention.

In FIG. 2, an arrangement of the magnetic focusing CRT 10 is substantially the same as the embodiment of FIG. 1. Thus, the same structural components are represented by the same reference numerals and their detailed explanations have been omitted. In this embodiment, a transistor Tr which supplies the horizontal drive pulse, a deflecting yoke DY, a horizontal linearity correction coil $L_0$, a direct current prevention condenser $C_1$, a resonating condenser $C_2$ and a dump diode $D_1$ are connected to a primary side coil $L_1$ of the transformer 12. The reference $L_3$ is a heater coil for a cathode K. The secondary side coil of the flyback transformer 12 is divided into a primary coil $L_4$ and a secondary coil $L_5$ and one terminal of the primary coil $L_4$ is grounded while an opposite terminal thereof is connected to a negative voltage rectifying circuit comprised of a diode $D_2$, a smoothing condenser $C_4$ and a bleeder resistor $R_1$. The negative output voltage regulated by bleeder resistor $R_1$ and the video signal are applied to the primary grid $G_1$ through the resistor $R_2$ and the condenser $C_6$ respectively. To the opposite terminal of the primary coil $L_4$ is connected the primary positive voltage rectifying circuit comprised of a diode $D_3$, smoothing condenser $C_5$, a bleeder resistor $R_3$ and a resistor $R_4$. To the secondary grid $G_2$ is applied the divided voltage output from the primary positive voltage rectification circuit after smoothed by the condenser $C_7$. The positive output voltage regulated by the bleeder resistor $R_3$ is smoothed by the condenser $C_8$ and applied on one of terminal secondary coil $L_5$ through the diode $D_4$. To the opposite terminal of the secondary coil $L_5$ is connected a secondary positive voltage rectifying circuit comprised of a diode $D_5$ and a smoothing condenser $C_3$ and an output thereof is applied to an anode A as an anode voltage.

The following is an operational explanation about an embodiment according to the invention as hereinbefore described.

A horizontal drive pulse is supplied to the transistor Tr, and as is well known, CRT 10 performs horizontal deflection operations with the deflection yoke DY. The flyback pulse generated at this time induces a high voltage in the secondary side coil of the flyback transformer 12. In this case, the induced voltage in the primary winding $L_4$ is exchanged into a positive or negative direct current voltage by the positive or negative rectifying circuit, and then applied to the primary grid $G_1$ and secondary grid $G_2$ after adjusted to the required voltage values respectively. Further, the output voltage from the primary positive voltage rectifying circuit is regulated by the bleeder resistor $R_3$ and then applied to the secondary coil $L_5$ with a high level direct current potential. Furthermore, a high voltage based on the flyback pulse is induced in the secondary coil $L_5$ per se so that an output voltage from the primary positive voltage rectifying circuit is added to the secondary positive voltage rectifying circuit comprised of a diode $D_5$ and a condenser $C_3$ to obtain an extremely high anode voltage.

In this case, the output voltage from the primary positive voltage rectifying circuit is regulated with the bleeder resistor $R_3$ to adjust the anode voltage to the desired value. As hereinbefore described, the secondary side coil is divided into the primary coil $L_4$ and the secondary coil $L_5$ so that the coil capacity is reduced resulting in reduction of ringing. Furthermore, a negative voltage rectifying circuit is provided in the primary coil $L_4$ and the bleeder resistor $R_1$ forming this negative voltage rectifying circuit provides a dumping resistance for further suppressing the ringing. In addition, the grid voltage to be applied to the primary grid $G_1$ and the secondary grid $G_2$ may be obtained from the primary coil $L_4$, so that a constant voltage may be retained independent of anode voltage adjustments.

Figure 3:
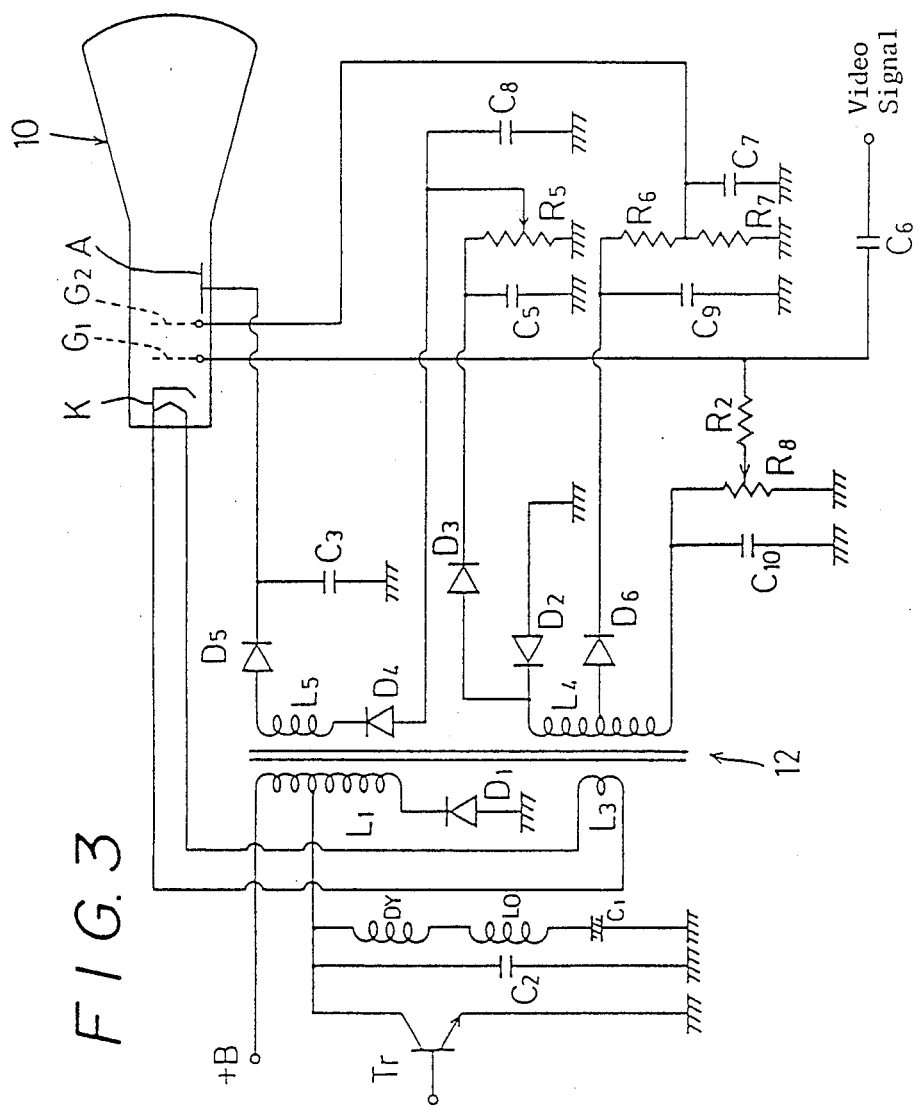
FIG. 3 is a circuit diagram of the focus voltage regulation circuit for cathode ray tubes (CRTs) of a further embodiment according to the invention.

The same reference numerals have been used in FIG. 3 for representing components in common with those in the embodiment shown in FIG. 2.

In the embodiment shown in FIG. 2, the voltage appearing on the other terminal of the primary coil $L_4$ is rectified to generate a grid voltage to be applied to the primary grid $G_1$ and the secondary grid $G_2$. In this embodiment, however, an intermediate tap is provided in the primary coil $L_4$ and the voltage induced there is rectified by a diode $D_6$. The grid voltage for the secondary grid $G_2$ is then obtained therefrom using a smoothing circuit comprised of resistors $R_6$ and $R_7$, and condenser $C_9$. Also, in contrast to the embodiment shown in FIG. 2, one terminal of the primary coil $L_4$ is connected to a smoothing circuit comprised of a condenser $C_{10}$ and a bleeder resistor $R_8$ and an anode of the diode $D_2$ is connected to the opposite terminal of the primary coil $L_4$ and is ground to obtain a grid voltage for the primary grid $G_1$ from the bleeder resistor $R_8$. Furthermore, the smoothing circuit to be connected to the diode $D_3$ is constructed by a condenser $C_5$ and a bleeder resistor $R_5$ and the voltage thereof is applied to the secondary coil $L_5$ like the embodiment in FIG. 2.

Therefore, in the circuit embodiment in FIG. 3 as well, the anode voltage may be regulated by adjusting the bleeder resistor $R_5$. The grid voltage may be maintained at a constant value irrelevant to anode voltage adjustments.

In the indicated embodiments shown in FIGS. 2 and 3, the secondary side coil of the flyback transformer is divided into the primary and secondary coils with reduction of the coil capacity and suppression of the ringing. Further, the grid voltage may conveniently be supplied to the CRT grid from the direct current voltage to be obtained by rectification of the induced voltage from the primary coil and also this direct current voltage may be regulated and then superimposed onto the induced voltage from the primary coil to obtain the combined voltage which is in turn rectified to obtain an anode voltage with extremely advantageous anode voltage adjustment.

Figure 4:
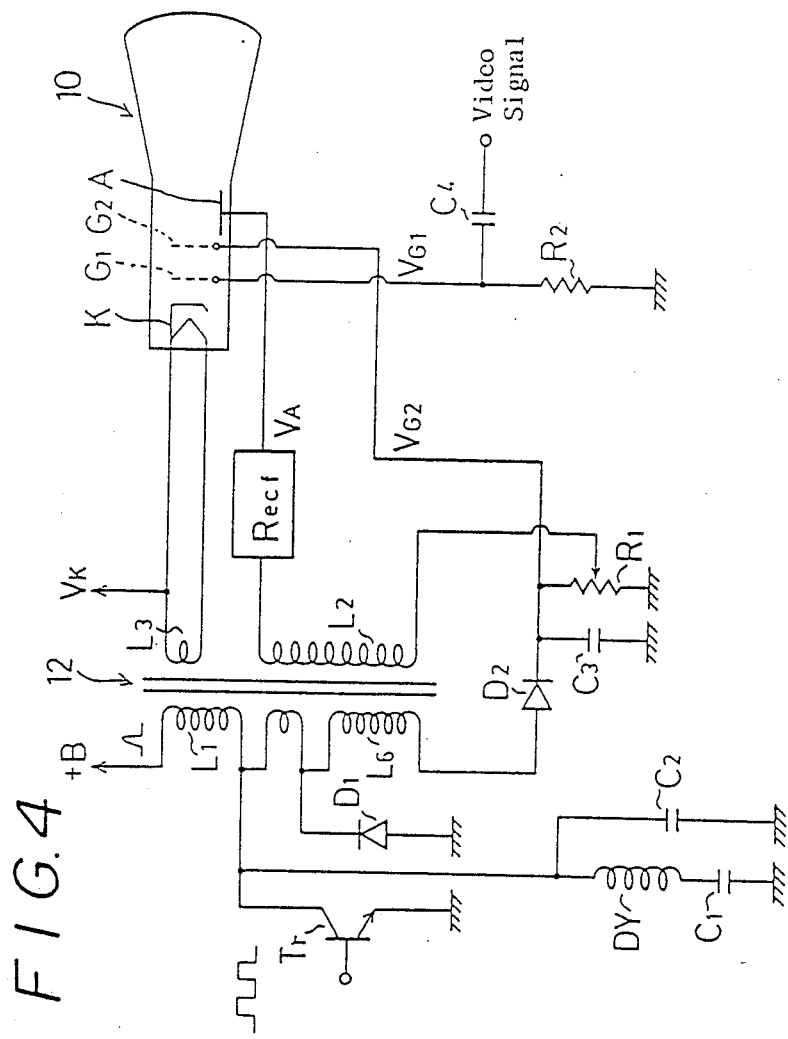
FIG. 4 is a circuit diagram of the focus voltage regulation circuit for cathode ray tubes (CRTs) of a still further embodiment according to the invention.

In FIG. 4, the same reference numerals are used for the similar components of the embodiment as shown in FIG. 1. In this embodiment, a supplementary coil $L_6$ is provided on the primary side of the flyback transformer 12 and the induced voltage generated in the supplementary coil $L_6$ is rectified through the diode $D_2$ and the smoothing condenser $C_3$ to obtain a supply voltage $V_{G2}$ for the secondary grid $G_2$. Further, a bleeder resistor $R_1$ is provided in the output lines of the diode $D_2$ and the condenser $C_3$ and the regulating voltage obtainable from the bleeder resistor $R_1$ is superimposed onto the anode voltage to be induced in the secondary side coil $L_2$ of the flyback transformer 12. The anode voltage thus obtained is applied to the anode of the CRT 10 through the rectifying circuit $R_{ecf}$. It should be noted that the video signal is supplied to the primary grid of the CRT 10 through the condenser $C_4$ and the resistor $R_2$.

According to this embodiment, a constant voltage may be supplied to the secondary grid $G_2$ of the CRT and this voltage may be effectively used as the regulating voltage for the anode voltage. More particularly, according to this embodiment, a constant voltage may be conveniently supplied from the primary side coil of the flyback transformer to the CRT grid and also this voltage may be utilized as the regulation voltage for the anode voltage so that the optimum focal point for the CRT may appropriately and smoothly be determined.

Figure 5:
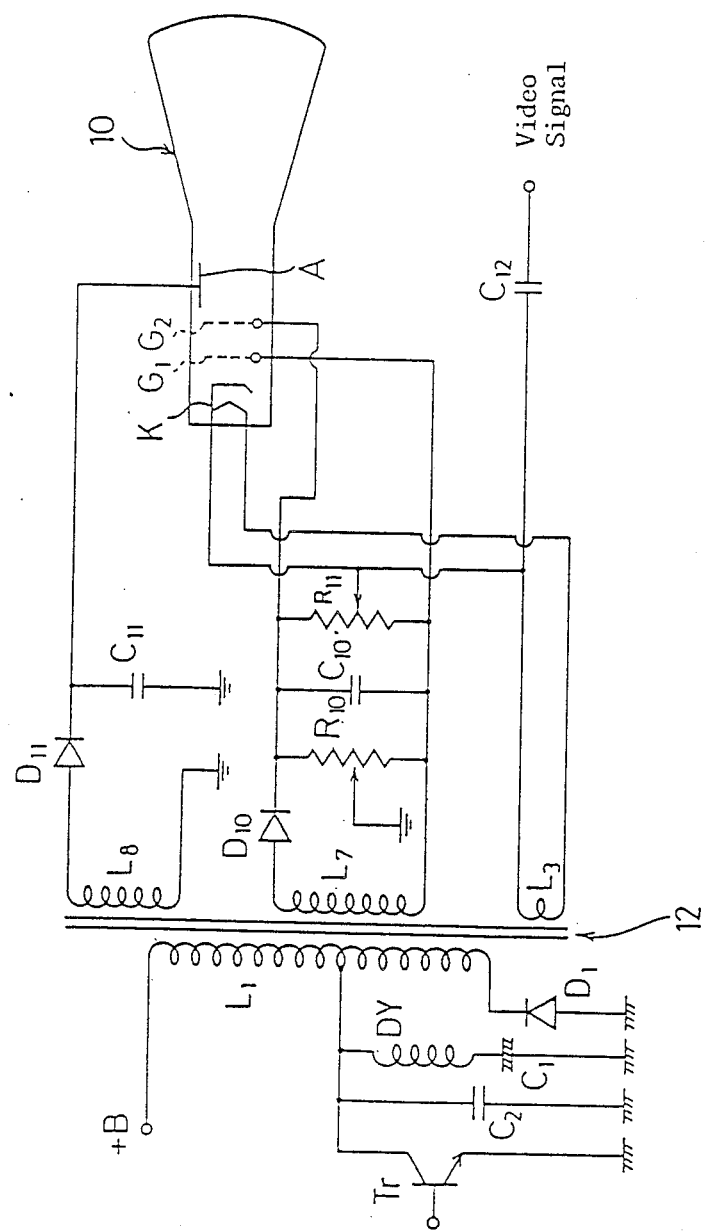
FIG. 5 is a circuit diagram of the focus voltage regulation circuit for cathode ray tubes (CRTs) of a more further embodiment according to the invention.

In FIG. 5, the same reference numerals are again used for the similar components to the embodiment shown in FIG. 1. In this embodiment, a coil $L_1$ is provided on the primary side of the flyback transformer 12 with exactly the same circuit arrangements as the embodiment in FIG. 1. The secondary side coil of the flyback transformer 12 is divided into a primary coil $L_7$ and a secondary coil $L_8$. To the primary coil $L_7$ is connected a voltage rectifying circuit comprised of a diode $D_{10}$, a bleeder resistor $R_{10}$, a smoothing condenser $C_{10}$ and a bleeder resistor $R_{11}$. One terminal of the secondary coil $L_8$ is grounded and to the opposite terminal thereof is connected a voltage rectifying circuit comprised of a diode $D_{11}$ and a smoothing condenser $C_{11}$. An output therefrom is applied to an anode A as the anode voltage. It should be noted that the coil $L_3$ is a heater coil for the cathode K. In this case, the primary coil $L_7$ is a floating coil and the intermediate tap of the bleeder resistor $R_{10}$ is fixed at a specified potential.

The intermediate tap of the bleeder resistor $R_{11}$ is arranged for supply to the cathode as a brightness adjustment voltage. Further, the negative side of the rectified voltage to be applied to the bleeder resistor $R_{11}$ is supplied as a voltage from the primary grid $G_1$ while the positive side thereof is supplied as a voltage from the secondary grid $G_2$. Furthermore, in this embodiment, a video signal is supplied through the condenser $C_{12}$ to the cathode K of the CRT.

In the circuit embodiment described thus constructed, by changing the position of the intermediate tap of the bleeder resistor $R_{10}$ provided for the primary coil $L_7$, the potentials of the cathode K, the primary grid $G_1$ and the secondary grid $G_2$ varied parallel to the anode voltage so that the relative potential difference between the anode voltage, the cathode voltage and the primary grid voltage may be changed irrelevant to the brightness of the CRT 10 or its modulation characteristics to obtain an optimum focus voltage.

The invention has been described with reference to the preferred embodiments, but the invention is in no way limited only to the embodiments described above, various changes may be made without departing beyond the spirit of the invention.

What is claimed is:

1. A focus voltage regulation circuit for cathode ray tubes, comprising means for rectifying a first voltage induced in a secondary winding of a flyback transformer to produce a direct current voltage and supplying said direct current voltage to the anode of a cathode ray tube; a tap provided on a part of said secondary winding for obtaining a second voltage from said secondary winding; a voltage-divided circuit comprising a variable resistor on its output side and receiving said second voltage obtained by said tap; said voltage-divided circuit generating a grid voltage to be applied to a grid of said cathode ray tube; and means superimposing a voltage regulated by said variable resistor onto a secondary winding.

2. A focus voltage regulation circuit for cathode ray tubes, comprising a flyback transformer having a secondary winding divided into a first secondary winding and a second secondary winding; means for rectifying, through a voltage-divided circuit comprising a variable resistor on its output side, a first voltage induced in said first secondary winding to produce a direct current voltage and supplying said direct current voltage to a grid of a cathode ray tube; means supplying a second voltage induced in said second secondary winding to the anode of said cathode ray tube; means superimposing a voltage regulated by said variable resistor onto said second secondary winding to obtain a combined voltage; and means rectifying said combined voltage and supplying the rectified combined voltage to the anode of a cathode ray tube.

3. A focus voltage regulation circuit for cathode ray tubes, comprising a flyback transformer having a secondary winding divided into a first secondary winding and a second secondary winding; means for rectifying a first voltage induced in said first secondary winding to produce a direct current voltage and supplying said direct current voltage to a secondary grid of a cathode ray tube; means supplying a second voltage induced in said second secondary winding to the anode of said cathode ray tube; a positive rectification circuit and a negative rectification circuit associated with said first secondary winding; means regulating direct current voltage obtained from said negative rectification circuit and supplying said regulated direct current voltage to a primary grid of said cathode ray tube along with a video signal; and means for dividing direct current voltage obtained from said positive rectification circuit and supplying a first part of said divided voltage to said secondary grid and regulating a second part of said divided voltage and superimposing said regulated second part of said divided voltage onto said second secondary winding.

4. A focus voltage regulation circuit for cathode ray tubes, comprising a flyback transformer having a first secondary winding and a second secondary winding; first and second positive rectification circuits associated with said first secondary winding; an intermediate tap provided on said first secondary winding and communicating with a third positive rectification circuit; means regulating a direct current voltage obtained from said first positive rectification circuit and supplying said regulated direct current voltage, along with a video signal, to a primary grid of a cathode ray tube; means supplying a direct current voltage obtained from said third positive rectification circuit to a secondary grid of said cathode ray tube; and means regulating a direct current voltage obtained from said second positive rectification circuit and superimposing said regulated direct current voltage onto said second secondary winding.

5. A focus voltage regulation circuit for cathode ray tubes, comprising a flyback transformer having a primary winding and a secondary winding divided into a first secondary winding and a second secondary winding; means supplying a flyback pulse induced in said first secondary winding to a cathode of a cathode ray tube; means supplying a voltage induced in said second secondary winding to the anode of said cathode ray tube; a coil tap provided on a part of said primary winding, said coil tap providing a first grid voltage to a first grid of said cathode ray tube through a rectifying circuit having a regulating resistance on its output side; and means obtaining a voltage regulated by said regulating resistance and superimposing said regulated voltage onto said second secondary winding.

6. A focus voltage regulation circuit for cathode ray tubes, comprising means for rectifying a first voltage induced in a first secondary coil of a flyback transformer, to obtain a direct current voltage which is supplied to the anode of a cathode ray tube; means for fixing a direct current load upon the reference point of potential of the second secondary winding of the flyback transformer; means for rectifying a second voltage induced in the second secondary winding of the flyback transformer, to obtain a direct current voltage which is supplied to a grid or the cathode of the cathode ray tube; and means for simultaneously regulating a direct current load upon the reference point of potential of the second secondary winding, such that the anode voltage is variably and relatively regulated against the grid and cathode voltages for focus adjustment.

* * * * *